United States Patent
Klein

(10) Patent No.: US 7,564,342 B2
(45) Date of Patent: Jul. 21, 2009

(54) AUDIO SIGNAL SYSTEM FOR VEHICLE REMOTE LOCKING MECHANISM

(75) Inventor: David Erik Klein, Toronto (CA)

(73) Assignee: Ridetones, Inc., Waterloo (CA)

( * ) Notice: Subject to any disclaimer, the term of this patent is extended or adjusted under 35 U.S.C. 154(b) by 501 days.

(21) Appl. No.: 10/958,178

(22) Filed: Oct. 4, 2004

(65) Prior Publication Data

US 2005/0110619 A1     May 26, 2005

Related U.S. Application Data

(60) Provisional application No. 60/507,937, filed on Oct. 3, 2003.

(51) Int. Cl.
G05B 23/02 (2006.01)
H04B 3/36 (2006.01)
B60R 25/10 (2006.01)
G08B 3/00 (2006.01)
G08B 3/10 (2006.01)
G05B 19/02 (2006.01)
H04B 1/20 (2006.01)

(52) U.S. Cl. ........... 340/425.5; 340/3.7; 340/425.1; 340/426.13; 340/426.15; 340/426.23; 340/426.28; 340/426.36; 340/384.1; 340/384.73; 340/825.24; 340/825.25; 340/825.72

(58) Field of Classification Search ........... 340/426.13, 340/426.15, 426.22, 825.72, 3.7, 384.1, 425.5, 340/426.23–426.28, 426.36, 384.73, 825.24, 340/825.25
See application file for complete search history.

(56) References Cited

U.S. PATENT DOCUMENTS

| 4,193,060 A | 3/1980 | Slavin et al. |
|---|---|---|
| 4,638,293 A | 1/1987 | Min |
| 5,040,990 A | 8/1991 | Suman et al. |
| 5,479,157 A | 12/1995 | Suman et al. |
| 5,568,120 A * | 10/1996 | LeMense et al. ....... 340/426.28 |
| 5,635,923 A | 6/1997 | Steele et al. |
| 5,663,704 A | 9/1997 | Allen et al. |
| 6,150,926 A | 11/2000 | Flick |

(Continued)

FOREIGN PATENT DOCUMENTS

DE     3 334 007     4/1985

(Continued)

OTHER PUBLICATIONS

U.S. Patent Application, "Event-Driven Content Playback System for Vehicles", U.S. Appl. No. 10/824,190, filed Apr. 14, 2004.

(Continued)

*Primary Examiner*—Benjamin C Lee
*Assistant Examiner*—Lam P Pham
(74) *Attorney, Agent, or Firm*—Carlson, Gaskey & Olds

(57) ABSTRACT

An audio signal system for a vehicle remote locking mechanism provides an audio signal that is more intricate than a simple, sounding of the vehicle's horn or beep tone. Preferably, the audio signal may be varied among many possible sounds by the operator. More preferably, the system includes a digital audio source with a signal amplifier and loudspeaker. Most preferably, the digital audio source is programmable with recorded sounds that can be transferred from a remote bank of digital sounds, for example by being downloaded from an internet website.

17 Claims, 1 Drawing Sheet

U.S. PATENT DOCUMENTS

| | | |
|---|---|---|
| 6,184,779 B1 | 2/2001 | Chen |
| 6,297,731 B1 | 10/2001 | Flick |
| 6,389,337 B1 | 5/2002 | Kolls |
| 6,429,773 B1 | 8/2002 | Schuyler |
| 6,472,771 B1 | 10/2002 | Frese et al. |
| 6,570,495 B1 * | 5/2003 | Lavelle et al. ............ 340/425.5 |
| 6,587,052 B1 * | 7/2003 | Flick ..................... 340/825.69 |
| 6,587,758 B2 | 7/2003 | Obradovich et al. |
| 6,696,938 B2 * | 2/2004 | Flick ........................ 340/468 |
| 6,697,719 B2 | 2/2004 | Stouffer et al. |
| 6,703,919 B2 * | 3/2004 | Baset ........................ 340/5.72 |
| 6,724,322 B2 * | 4/2004 | Tang et al. .................. 340/989 |
| 6,744,358 B1 | 6/2004 | Bollinger |
| 6,744,364 B2 * | 6/2004 | Wathen .................. 340/539.1 |
| 6,924,735 B2 * | 8/2005 | Ueda et al. ............. 340/426.28 |
| 6,927,685 B2 * | 8/2005 | Wathen .................. 340/539.1 |
| 7,050,795 B2 | 5/2006 | Wiegand et al. |
| 7,065,439 B2 * | 6/2006 | Sakakura ..................... 701/49 |
| 7,069,127 B2 | 6/2006 | Stouffer et al. |
| 2002/0032876 A1 | 3/2002 | Okagaki et al. |
| 2003/0210132 A1 | 11/2003 | Tang et al. |
| 2004/0080403 A1 * | 4/2004 | Eshel ..................... 340/425.5 |
| 2004/0217848 A1 * | 11/2004 | Cheng ..................... 340/425.5 |
| 2005/0144251 A1 | 6/2005 | Slate |

FOREIGN PATENT DOCUMENTS

| | | |
|---|---|---|
| EP | 1 134 132 | 9/2001 |
| JP | 2000-322073 | 11/2000 |

OTHER PUBLICATIONS

International Search Report, Jan. 20, 2005.

U.S. Appl. No. 11/619,202, "Customizable Event Driven Content Playback System," filed Jan. 3, 2007.

U.S. Appl. No. 60/507,937, "Audio Signal System for Vehicle Remote Locking Mechanism," filed Oct. 2, 2003.

International Search Report, PCT Application No. PCT/CA2007/000001, Apr. 27, 2007.

U.S. Appl. No. 10/824,190, Final Office Action, mailed Aug. 20, 2008.

U.S. Appl. No. 10/824,190, Response After Final, filed Nov. 20, 2008.

U.S. Appl. No. 10/824,190, Advisory Action, mailed Nov. 26, 2008.

European Application No. 04 789 703.8, Office Action mailed on Feb. 11, 2009.

* cited by examiner

AUDIO SIGNAL SYSTEM FOR VEHICLE REMOTE LOCKING MECHANISM

This application claims priority to U.S. Provisional Application Ser. No. 60/507,937 filed Oct. 3, 2003.

BACKGROUND OF THE INVENTION

This invention relates generally to audio signaling devices, and more particularly to audio signaling devices to be used with remote control locking mechanism for motor vehicles.

Many automobiles and other motor vehicles are equipped with remote control devices for locking and unlocking the doors of the vehicle. Such keyless entry remote control devices generally employ a low power radio frequency signal to activate the locking mechanism of the vehicles doors. Infrared signal devices are also used but are less common, in many cases, the remote control simultaneously activates an anti-theft security system.

To engage the remote control unit, the operator simply pushes a button. In some cases, the remote control unit would have two separate buttons for locking and unlocking the vehicle, and in other cases the remote control units have only a single button which both locks and unlocks the vehicle.

While the devices are relatively simple to operate, they do nonetheless have limitations. If a button is pressed with insufficient force, the remote control will not generate the radio signal that is intended to activate the lock mechanism. On units having a single button, it is possible as well to misapply the button so that two separate consecutive signals are generated. A person intending to lock his vehicle can thereby inadvertently unlock it again. On remote controls with two separate buttons for locking and unlocking the vehicle, it is also possible to inadvertently press the wrong button.

Moreover, drivers will from time to time question whether they have remembered to lock their vehicles' doors after parking them and walking some distance away. Many keyless entry remote control devices using radio frequency signals are operable for distances over 100 feet. However, the signal becomes increasingly unreliable with greater distances due to physical obstacles and radio interference.

If an operator can easily see the interior door lock stems of the vehicle he can verify if the remote control device has worked as intended. However, often when the remote control device is used the operator cannot see the interior door lock stems, either because he is too far away or because his view is obstructed.

To help address this problem, vehicle manufacturers have included circuitry into keyless door locking mechanisms such that engaging the remote control will simultaneously cause the vehicle's headlights and taillights to flash and/or cause the vehicle's horn to sound.

While activating the vehicle's headlights and taillights may sometimes be more easily seen than the position of the vehicle's interior door lock stems, if nonetheless suffers from similar drawbacks if the operator's view of the vehicle is blocked, or if he is too far away, particularly in daylight hours when the vehicle lights are less visible.

Sounding of the vehicle's horn does provide in many ways a satisfactory signal so that the operator can verify whether the remote control device has been properly engaged and its signal properly received by the vehicle's locking mechanism. Sounding of the horn can also assist a driver to relocate his vehicle when he returns to a large and crowded parking area. Many individuals from time to time remember only the general vicinity in which they have parked their vehicle. Unless they are able to see it, they may experience some difficulty to know its exact location. Rather than having to search through numerous rows of vehicles, the sounding of the vehicle's horn when its keyless entry remote control is engaged can provide considerable assistance in locating the vehicle.

However, car horns all sound very similar. If two or more vehicle operators concurrently engage their keyless entry remote control devices it may be difficult to distinguish one vehicle's horn from the other. Similarly, when a driver uses the remote control to lock his vehicle while walking away from it, the signal of a horn sounding cannot necessarily be identified as coming from his own vehicle.

In some vehicles equipped with anti-theft security systems, a separate sound source is used to provide a pre-set audio signal such as a beep tone, to indicate activation of the security system by the keyless entry remote control device, rather than the vehicle's horn. Even such audio signals offer little choice or distinctiveness.

Accordingly, it is desirable to have an audible signal that is more readily distinguishable to verify the activation of a particular vehicle's keyless entry remote control mechanism.

SUMMARY OF THE INVENTION

In accordance with the present invention, a system is provided for a vehicle remote control locking mechanism that provides an audio signal that is more intricate than a simple, sounding of the vehicle's horn or beep tone. Preferably, the audio signal may be varied among many possible sounds by the operator. More preferably, the system includes a digital audio source with a signal amplifier and loudspeaker. Most preferably, the digital audio source is programmable with recorded sounds that can be transferred from a remote bank of digital sounds, for example by being downloaded from an internet website.

Including connectivity means in the digital audio source by which digital sound recording can be transferred to it, for example from an MP3 player or from an internet website, provides an almost limitless selection of sounds for use as the audio signal for a vehicle's remote control locking mechanism. These may include unique tones created specifically for the purpose. They may also include, subject to obtaining any required permission from copyright owners, brief excerpts of recorded music, CDs or lines of dialogue from motion picture DVDs.

The consequent ease of selection of different sound recording also facilitates using the audio signal to provide a source of amusement. For example, the owner of a motor vehicle could regularly change the audio signal for his vehicle's remote control locking mechanism to his current favorite "top 40" song, or different recorded lines of dialogue from motion pictures. Recorded sounds available on an internet website could also include voice messages, such as greetings or warnings, or expressions of support for favorite sports teams.

Operation of an internet website making available a bank of downloadable recorded sounds for such an audio signal system for vehicle remote control locking mechanisms may be undertaken on a commercial basis, with customers making payments for each recorded sound they download. The operator of the internet website could also derive revenue from selling advertising, for example, in connection with promoting recorded music and motion pictures for which sound extracts would be available for downloading.

In order that the invention may be more fully understood, various embodiments thereof will now be described in greater detail, it being understood that such description is by way of example only, and is not limiting.

BRIEF DESCRIPTION OF THE DRAWINGS

Other advantages of the present invention can be understood by reference to the following detailed description when considered in connection with the accompanying drawings wherein:

The FIGURE schematically illustrates an audio signal system for a vehicle remote locking mechanism according to the present invention.

DETAILED DESCRIPTION OF THE PREFERRED EMBODIMENTS

Figure 1:
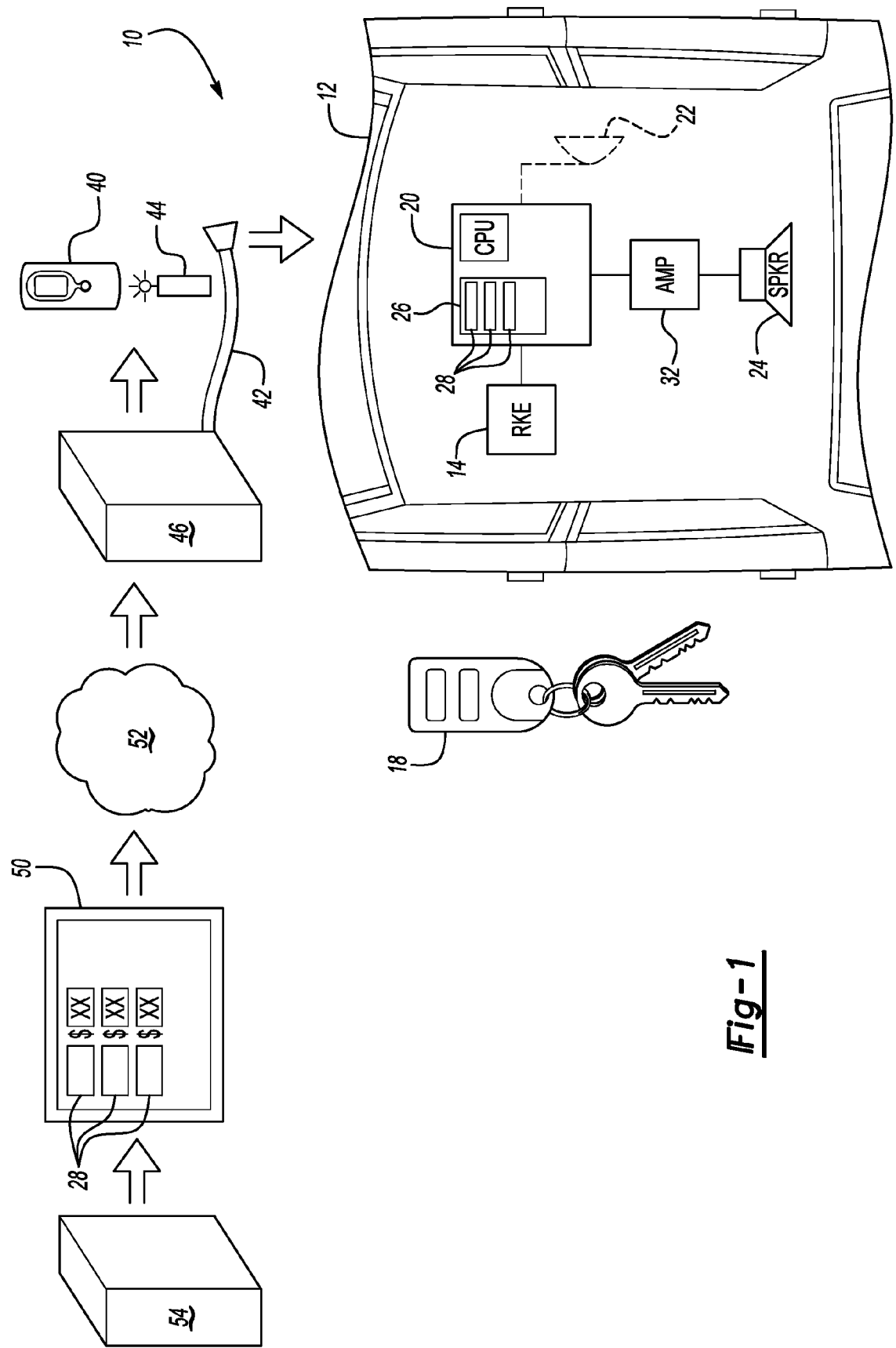

One embodiment of the audio signal system 10 for a vehicle remote locking mechanism according to the present invention is shown schematically in the FIGURE as installed in a vehicle 12, such as an automobile, having a remote keyless entry locking mechanism 14. The RKE locking mechanism 14 includes a receiver that receives radio signals (or infrared or other wireless signals) from the corresponding remote control device 18, which is housed in a key fob or directly on the vehicle's ignition key. The receiver of the RKE locking mechanism 14 is connected to an audio signal circuit or controller 20 having a CPU, such that the controller 20 is activated to produce an audio signal when the remote control device 18 is engaged to lock or unlock the vehicle 12.

In a simplified embodiment of the invention, the audio signal is generated by the vehicle's horn 22. However, instead of producing a single sounding of the horn as is known, the horn 22 is made to produce a more distinguishable sound such as a rhythmic pattern, which may for example use a combination of long and short tones as in Morse code. Many different combinations of long and short tones can be combined to produce brief but distinguishable audio signals. The particular signal for each vehicle could be preset by the manufacturer, or could be selected or programmed by the operator.

Preferably though, the audio signal is generated not by the vehicle's horn 22 but by an externally mounted loudspeaker 24 that reproduces a pre-recorded sound. Because a loudspeaker 24 can reproduce complex audio signals or sound waves of wide ranging frequencies and volumes, it enables an essentially infinite number of different recorded sounds to be used as the audio signal for a vehicle's RKE locking mechanism 14. As used herein, "complex" audio signals includes signals where the sound wave is actually represented in some way, such as in AIFF, WAV, MP3, AAC, WMV and other compressed or uncompressed sound files, and excludes monophonic or polyphonic audio.

In a more preferred embodiment, the controller 20 of the audio signal system 10 has a digital audio storage 26 that includes a large number of recorded sound clips 28. The digital audio storage 26 may be RAM and/or a hard drive, and/or any other optical, magnetic, electronic or other suitable digital storage. Based upon the recorded sound clips 28 stored in the digital audio storage 26, the controller 20 produces an electronic signal that is amplified by means of an amplifier 32, which may be the amplifier 32 included in the vehicle's passenger compartment sound system or a separate amplifier. The amplified signal is carried to the exterior loudspeaker 24 mounted in a discrete, protected area, for example under the vehicle's hood. The operator can choose for the vehicle's keyless entry audio signal any of the digital audio source's recorded sound clips 28, which may include, for example, music or speech as well as simpler tone sounds.

Most preferably, the digital audio storage 26 includes connectivity means by which additional digital recorded sound clips 28 can be transferred to it, such as by means of a portable MP3 player 40, or through either a wired 42 or wireless 44 connection to a personal computer 46. The personal computer 46 has access to an internet website 50 via a wide area network 52, such as the internet. The website 50 provides a bank of downloadable sound recording clips 26 stored on a server 54.

The present invention thus has the potential to provide essentially limitless different recorded sounds that are used as the audio signal by which a vehicle operator can readily verify that his vehicle's keyless entry mechanism has been activated. Because of the wide choice of recorded sounds potentially available, the audio signal for each vehicle can be easily distinguished, and there is less potential for confusion.

The personalized nature of the distinctive audio signal that each vehicle operator selects may also provide a source of amusement to the operator, and to others who hear the signal.

It will of course be appreciated that many variations will be possible within the broad scope of the present invention.

What is claimed is:

1. An audio signal system for a motor vehicle having a remote control locking mechanism, comprising:
    a receiver capable of receiving a wireless signal from a remote control device when said remote control device is engaged;
    said receiver activating a locking mechanism based upon receiving the wireless signal;
    the wireless signal activating an audio signal circuit that generates one or more complex audio signals; and
    an exterior loudspeaker for generating said one or more complex audio signals based upon the receiver receiving the wireless signal;
    wherein said audio signal circuit comprises at least one of a digital audio storage having a plurality of digitized music files and a storage having a reproducible recorded sound to produce said one or more complex audio signals.

2. The system of claim 1 wherein said digital audio storage produces an electronic signal that is amplified by an amplifier and carried to said loudspeaker.

3. The system of claim 2 wherein said digital audio storage includes connectivity via which digital sound recordings can be transferred to it.

4. The system of claim 1 wherein said digital audio storage includes at least one MP3.

5. The system of claim 1 wherein the audio signal circuit generates the one or more complex audio signals based upon the wireless signal.

6. An audio signal system comprising:
    a receiver for receiving a wireless signal;
    a lock locking and unlocking a vehicle based upon the receiver receiving the wireless signal;
    an audio player playing a complex audio sound based upon the receiver receiving the wireless signal; and
    a digital audio storage that produces an electronic signal that is amplified by an amplifier and carried to a loudspeaker mounted exterior the vehicle;
    wherein said digital audio storage includes at least one of connectivity means by which digital sound recordings can be transferred to it and a plurality of digitized music files.

7. The system of claim 6 wherein said digital audio storage includes at least one MP3.

8. The system of claim 6 wherein the audio player generates the one or more complex audio signals based upon the wireless signal.

9. A method for activating a remote keyless entry system of a vehicle including the steps of:

a) receiving a wireless signal using a receiver;
b) activating a lock based upon the receiver receiving the wireless signal; and
c) playing a complex audio sound based upon the receiver receiving the wireless signal;
d) selecting a digital audio file;
e) storing the selected digital audio file on the vehicle; and
f) playing the selected digital audio file in said step c) exterior the vehicle using an exterior loudspeaker; wherein the digital audio file is a music file or a recorded sound.

10. The method of claim 9 wherein said step b) includes the step of locking the lock.

11. The method of claim 10 further including the step of sending the wireless signal from a handheld wireless transmitter.

12. An audio signal system for a motor vehicle having a remote control locking mechanism, comprising:
   a receiver capable of receiving a wireless signal from a remote control device when said remote control device is activated;
   a locking mechanism actuated based upon the receiver receiving the wireless signal;
   a digital audio storage storing a plurality of digitized audio files of complex sounds;
   an audio signal circuit that generates an audio signal based upon the digitized audio files and in response to the receiver receiving the wireless signal;
   an amplifier for amplifying the audio signal from the audio signal circuit; and
   a speaker mounted exterior to the vehicle for generating complex sounds based upon the audio signal amplified by the amplifier.

13. The system of claim 12 wherein said digital audio storage includes connectivity means by which digital sound recordings can be transferred to it.

14. The system of claim 13 wherein said digitized audio files include a plurality of digitized music files.

15. The method of claim 9 further including the step of downloading the digital audio file over a wide area network between said steps d) and f).

16. The method of claim 9 wherein said step d) is performed by a user.

17. The system of claim 12 wherein the said digitized audio files include a plurality of digitized music files.

* * * * *